(12) United States Patent
Leiser

(10) Patent No.: US 9,560,896 B1
(45) Date of Patent: Feb. 7, 2017

(54) INSOLE FOR FOOTWEAR

(71) Applicant: SoxsolS, LLC, Corvallis, OR (US)

(72) Inventor: Judson M. Leiser, Corvallis, OR (US)

(73) Assignee: SoxsolS, LLC, Corvallis, OR (US)

( * ) Notice: Subject to any disclaimer, the term of this patent is extended or adjusted under 35 U.S.C. 154(b) by 18 days.

(21) Appl. No.: 14/620,074

(22) Filed: Feb. 11, 2015

Related U.S. Application Data

(60) Provisional application No. 61/939,168, filed on Feb. 12, 2014.

(51) Int. Cl.
| | |
|---|---|
| A43B 17/14 | (2006.01) |
| A43B 13/38 | (2006.01) |
| B05D 1/02 | (2006.01) |
| B05D 7/00 | (2006.01) |
| A43B 17/00 | (2006.01) |
| B05D 1/34 | (2006.01) |
| B05D 1/30 | (2006.01) |
| B05D 1/26 | (2006.01) |
| B05D 3/02 | (2006.01) |
| A43B 17/18 | (2006.01) |

(52) U.S. Cl.
CPC ........... *A43B 13/386* (2013.01); *A43B 17/003* (2013.01); *A43B 17/006* (2013.01); *A43B 17/14* (2013.01); *A43B 17/18* (2013.01); *B05D 1/02* (2013.01); *B05D 1/26* (2013.01); *B05D 1/30* (2013.01); *B05D 1/34* (2013.01); *B05D 3/02* (2013.01); *B05D 7/50* (2013.01); *B05D 7/54* (2013.01); *B05D 7/542* (2013.01); *B05D 7/5423* (2013.01)

(58) Field of Classification Search
None
See application file for complete search history.

(56) References Cited

U.S. PATENT DOCUMENTS

| | | | |
|---|---|---|---|
| 2,181,787 | A | 11/1939 | Lumbard |
| 2,211,057 | A | 8/1940 | Duckoff |
| 2,231,552 | A | 2/1941 | Sewall |
| 2,307,416 | A | 1/1943 | Margolin |
| 2,556,364 | A | 6/1951 | Lumbard |

(Continued)

FOREIGN PATENT DOCUMENTS

| | | |
|---|---|---|
| CN | 101489753 A | 7/2009 |
| CN | 101553146 A | 10/2009 |

(Continued)

OTHER PUBLICATIONS

Photographs of Sciünci®, No-Slip Grip headband, 2 photographs.

(Continued)

*Primary Examiner* — Erma Cameron
(74) *Attorney, Agent, or Firm* — Klarquist Sparkman, LLP

(57) ABSTRACT

The present disclosures concerns embodiments of a footwear insole that can be used with various types of footwear, including, without limitation, shoes (including open and closed toe shoes), boots, sandals, etc. The insole includes an upper fabric layer that comes in contact with the foot and a cushioning base layer that contacts the footbed of the footwear. The base layer desirably is formed from a self-adhering material that can be applied to in liquid form to the fabric and bonds directly to the fibers of the fabric when cured, so as to eliminate the need for a separate intermediate adhesive layer for securing the fabric to the base layer. The base layer is also configured to substantially prevent shrinkage of the insole when subjected to multiple wash and dry cycles.

13 Claims, 9 Drawing Sheets

(56) References Cited

U.S. PATENT DOCUMENTS

| | | |
|---|---|---|
| 2,700,625 A | 1/1955 | Morris et al. |
| 2,732,324 A | 1/1956 | Morris |
| 3,835,558 A | 9/1974 | Revill |
| 3,929,140 A | 12/1975 | Wesberg |
| 3,985,853 A | 10/1976 | Weisberg |
| 4,055,699 A | 10/1977 | Hsiung |
| 4,183,156 A | 1/1980 | Rudy |
| 4,808,469 A | 2/1989 | Hiles |
| 4,934,070 A | 6/1990 | Mauger |
| 5,143,676 A | 9/1992 | Müller et al. |
| 5,154,682 A | 10/1992 | Kellerman |
| 5,189,816 A | 3/1993 | Shibata |
| 5,233,769 A | 8/1993 | Weber |
| 5,319,867 A | 6/1994 | Weber |
| 5,551,173 A | 9/1996 | Chambers |
| 5,669,161 A | 9/1997 | Huang |
| 5,675,914 A | 10/1997 | Cintron |
| 5,714,229 A | 2/1998 | Ogden |
| 5,737,776 A | 4/1998 | Jennings |
| 5,789,084 A | 8/1998 | Nakamura et al. |
| 5,845,418 A | 12/1998 | Chi |
| 5,897,517 A | 4/1999 | Laghi |
| 5,915,819 A | 6/1999 | Gooding |
| 5,925,709 A | 7/1999 | Takahashi et al. |
| 6,199,304 B1 | 3/2001 | Ludemann |
| 6,268,300 B1 | 7/2001 | Hernandez et al. |
| 6,286,232 B1 | 9/2001 | Snyder et al. |
| 6,338,768 B1 | 1/2002 | Chi |
| 6,419,988 B1 | 7/2002 | Sovell |
| 6,441,086 B1 | 8/2002 | Wolfer et al. |
| 6,481,120 B1 | 11/2002 | Xia et al. |
| 6,620,472 B1 | 9/2003 | Shepard et al. |
| 6,766,539 B1 | 7/2004 | Huber |
| 6,846,508 B1 | 1/2005 | Colas et al. |
| 6,946,196 B2 | 9/2005 | Foss |
| 7,026,397 B2 | 4/2006 | Hasegawa et al. |
| 7,037,571 B2 | 5/2006 | Fish et al. |
| 7,047,671 B2 | 5/2006 | Steed et al. |
| 7,107,626 B1 | 9/2006 | Andrews |
| 7,107,704 B2 | 9/2006 | Dennis et al. |
| 7,264,303 B2 | 9/2007 | Fukudome et al. |
| 7,346,935 B1 | 3/2008 | Patterson |
| 7,683,125 B2 | 3/2010 | Shirasaki et al. |
| 7,827,640 B2 | 11/2010 | Koo et al. |
| 8,206,831 B2 | 6/2012 | Aoki |
| 8,603,378 B2 | 12/2013 | Müller et al. |
| 2001/0045028 A1 | 11/2001 | Crane et al. |
| 2002/0066209 A1 | 6/2002 | Steed et al. |
| 2002/0086935 A1 | 7/2002 | Ferritto et al. |
| 2002/0092199 A1 | 7/2002 | Fish et al. |
| 2002/0092203 A1 | 7/2002 | Hardt |
| 2002/0144433 A1 | 10/2002 | Dennis et al. |
| 2004/0159015 A1 | 8/2004 | Dennis et al. |
| 2004/0194352 A1 | 10/2004 | Campbell et al. |
| 2004/0237343 A1 | 12/2004 | Herman |
| 2005/0060910 A1 | 3/2005 | Kaneda et al. |
| 2006/0026866 A1 | 2/2006 | Avent et al. |
| 2006/0277797 A1 | 12/2006 | McLinden |
| 2007/0022630 A1 | 2/2007 | Lundy et al. |
| 2007/0028485 A1 | 2/2007 | Crane et al. |
| 2007/0043316 A1 | 2/2007 | Carlson et al. |
| 2008/0003370 A1 | 1/2008 | Sweet et al. |
| 2008/0010861 A1 | 1/2008 | Kosmas |
| 2008/0115385 A1 | 5/2008 | McLinden |
| 2008/0178799 A1 | 7/2008 | Kohno et al. |
| 2008/0229612 A1 | 9/2008 | Sommer et al. |
| 2008/0271340 A1 | 11/2008 | Grisoni et al. |
| 2008/0319099 A1 | 12/2008 | Zhou et al. |
| 2009/0094861 A1 | 4/2009 | Orvitz |
| 2009/0205222 A1 | 8/2009 | McLinden |
| 2009/0320324 A1 | 12/2009 | Yang et al. |
| 2010/0083534 A1 | 4/2010 | Howlett |
| 2010/0122475 A1 | 5/2010 | Purrington et al. |
| 2010/0186257 A1 | 7/2010 | Karl et al. |
| 2011/0041780 A1 | 2/2011 | Hurwitz |
| 2011/0094124 A1 | 4/2011 | Zona |
| 2011/0145979 A1 | 6/2011 | Degni |
| 2011/0283562 A1 | 11/2011 | Shrum et al. |
| 2011/0302805 A1 | 12/2011 | Vito |
| 2014/0298681 A1 | 10/2014 | Epstein |

FOREIGN PATENT DOCUMENTS

| | | |
|---|---|---|
| DE | 20 2005 012 286 | 10/2005 |
| DE | 20 2007 008 016 | 8/2007 |
| EP | 0 272 690 A2 | 6/1988 |
| FR | 2 929 083 A1 | 10/2009 |
| WO | WO96/13994 A1 | 5/1996 |
| WO | WO2007/141000 A2 | 12/2007 |
| WO | WO2008/019084 A2 | 2/2008 |
| WO | WO2010/039929 A1 | 4/2010 |

OTHER PUBLICATIONS

Photographs of Under Armour®, 4 Point Grippy Headband, 2 photographs.

www.wacker.com/ems/media/publications/downloads/6313_EN.pdf, downloaded Aug. 7, 2013, 8 pages.

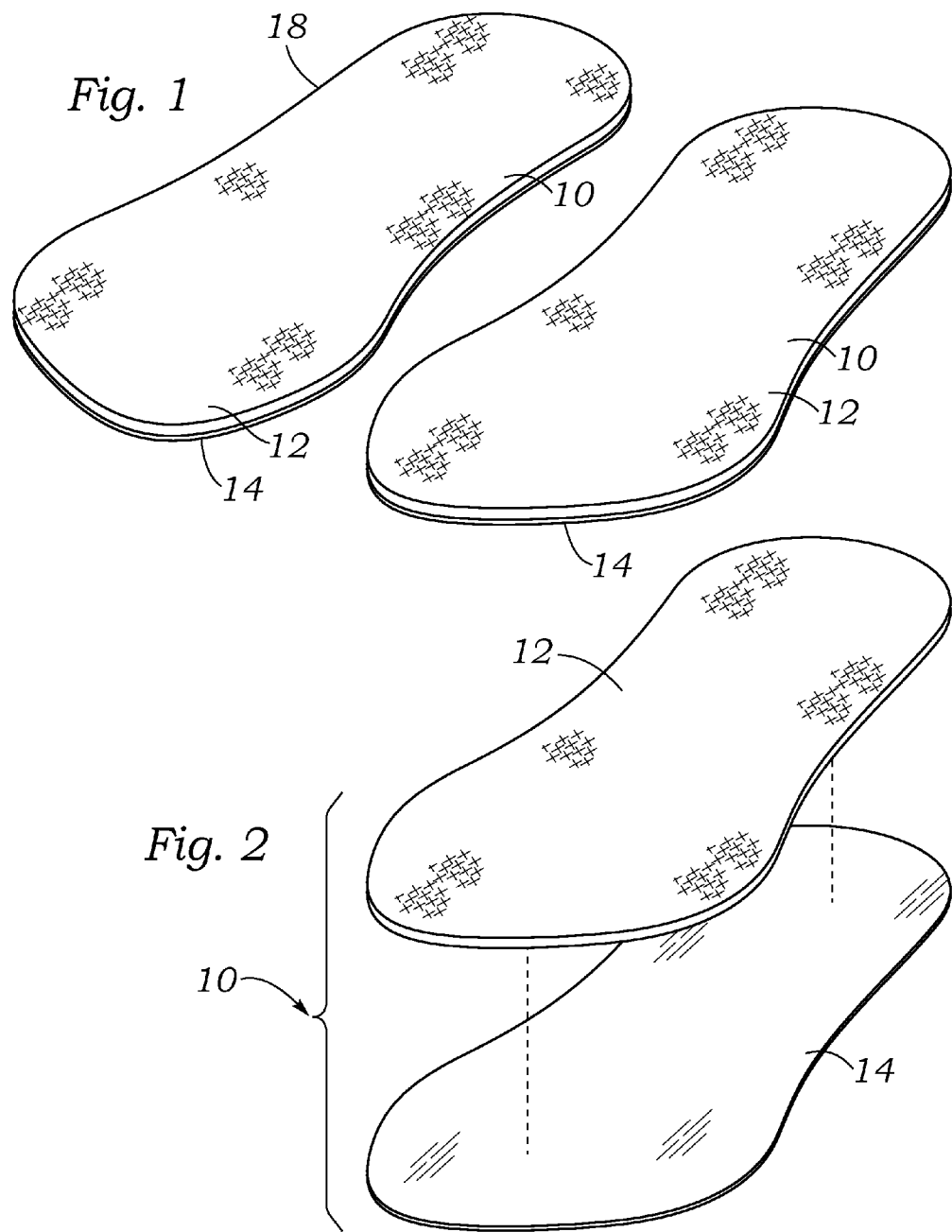

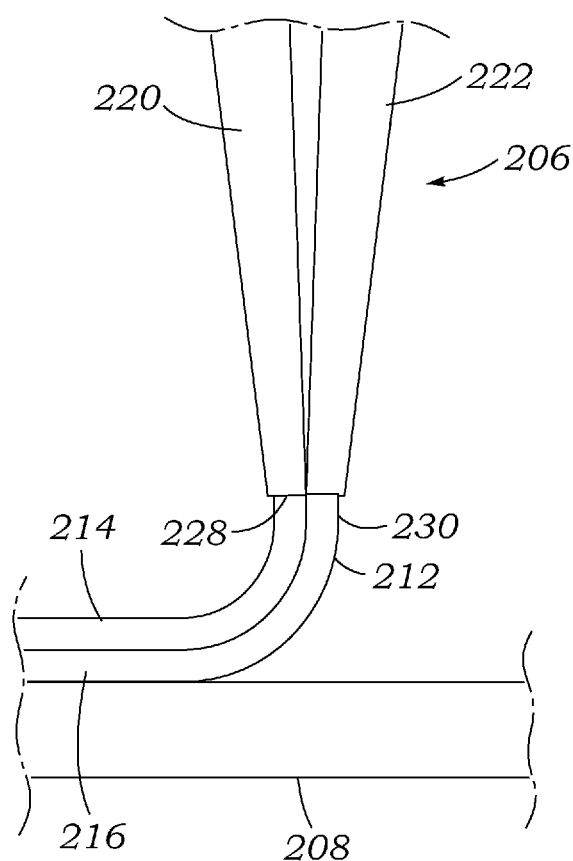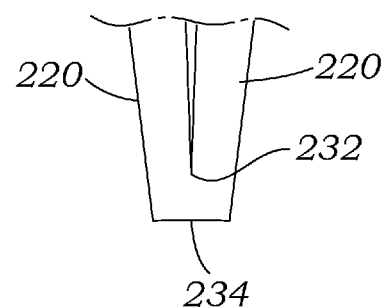

INSOLE FOR FOOTWEAR

CROSS-REFERENCE TO RELATED APPLICATION

The present application claims the benefit of U.S. Provisional Application No. 61/939,168, filed Feb. 12, 2014, which is incorporated herein by reference in its entirety.

FIELD

The present application pertains to an insole for footwear, such as shoes, sandals, boots, etc.

BACKGROUND

Textiles are used in various applications as an interface between an object or body part and an underlying surface to avoid direct contact between the object/body part and the underlying surface. In many such applications, a slip-resistant bottom layer, usually formed from a polymeric material, is added to the textile to prevent or minimize slippage or shearing between the textile and the underlying surface. Some examples include coasters, floor mats, dining placemats, and footwear insoles. As many of these applications may result in the textile being soiled, it is desirable to employ fabrics that can be repeatedly washed and dried, preferably using a washing machine and dryer. Although many fabrics are generally washable, many polymeric materials that are currently used to increase adherence to an underlying surface (e.g., a floor, shelf, footbed, etc.) are not washable.

When people wear shoes they almost always wear socks. Socks create friction between the foot and shoe for better engagement of foot motions by the shoe, absorb moisture perspired by the foot, create a path between the shoe and skin of the foot to allow air to circulate about the foot, and can keep the foot warm in cold weather or cool in hot weather. However, people wear a number of shoe styles without socks, such as, various sandals, deck shoes, etc. When not wearing socks, the sole of the foot is almost in constant contact with the upper surface of the footbed.

On a hot day a sandal wearer can be very comfortable everywhere but at the sole of the foot. The intimate contact between the foot sole and the footbed of the footwear leaves no room for air to circulate under the foot and can cause considerable sweat under foot. This can be uncomfortable and it can also result in footwear that carries odor.

The problem of lack of breathability at the interface between the footwear and the foot is exacerbated by modern synthetic materials. Some of these synthetic materials can be worse for breathability than traditional materials and can increase both the problem of foot sweat and of footwear odor. For instance, the smooth vinyl foam of the popular Crocs® sandals, when in intimate contact with the sole, can lead to substantial sweating. Many insoles are nothing more than polymer sheets pressed into a shape and are not particularly breathable.

To prevent sweating and foot odor, people often wear socks with sandals and other types of open footwear. However, many people find this aesthetically unappealing. In addition, one loses much of the benefit of wearing open footwear when wearing socks.

Mechanically, open footwear doesn't lend itself to maintaining a breathable textile under foot in the way that a sock maintains itself about the foot. For example, open footwear doesn't capture and retain an insole in place like closed sole footwear, such as a shoe. To solve this, adhesives have been used to bond a fabric insole in place against the footbed of the footwear. Unfortunately, the adhesives do generally not retain their chemistries through the wash cycle of a laundry. Adhesives can delaminate from the textile, and they do not prevent certain textiles from shrinking. Furthermore, adhesives may stick too well to areas of the footbed and can remove portions of the footbed when the insole is removed from the shoe. To overcome the inability to wash the textile, much of the prior art suggests the use of perfume or odor fighting chemistry to hide or mitigate odor.

Ultimately what is needed is a variety of textiles, appropriate for different conditions (warm materials for cool weather, cool materials for warm weather) that can adhere to a footbed (or other substrate in other applications). These textiles desirably should be removable from footwear without pulling out parts of the footbed. These textiles should be washable with household laundry without worry about shrinkage and wearable afterwards. They should be robust to an indefinite number of wash and wear cycles.

SUMMARY

The present disclosures concerns embodiments of a footwear insole that can be used with various types of footwear, including, without limitation, shoes (including open and closed toe shoes), boots, sandals, etc. The insole includes an upper fabric layer that comes in contact with the foot and a cushioning base layer that contacts the footbed of the footwear and provides cushion to the foot. The base layer desirably is formed from a self-adhering material that can be applied in liquid form to the fabric and bonds directly to the fibers of the fabric when cured, so as to eliminate the need for a separate intermediate adhesive layer for securing the fabric to the base layer. The base layer also exhibits sufficient tackiness to hold the insole in place against the footbed during use, yet allows removal of the insole without pulling out parts of the insole. The base layer is also configured to substantially prevent shrinkage of the insole when subjected to multiple wash and dry cycles. In particular embodiments, the base layer is formed from a liquid silicone rubber.

In one representative embodiment, an insole for insertion into footwear comprises a fabric layer having a peripheral edge defining a toe portion, a heel portion, and an arch portion. The insole also has a base layer comprised of a self-adhering material that is directly bonded to the bottom surface of the fabric layer and covers substantially the entire bottom surface of the fabric layer.

In another representative embodiment, a method for making footwear insoles is provided. The method comprises applying a continuous layer of a self-adhering coating material along the length of a surface of a fabric layer to form a laminate, and curing the coating material applied to the fabric layer, which causes the coating material to bond directly to the fabric layer. After curing the coating material, one or more insoles are cut or otherwise formed from the laminate.

In another representative embodiment, a method for making footwear insoles comprises simultaneously applying a first continuous layer of a first self-adhering material along the length of a surface of a fabric layer and applying a second continuous layer of a second self-adhering material over the first layer to form a laminate, wherein the first self-adhering material has a greater surface tension than the second self-adhering material. The method further comprises curing the first and second layers, causing at least a portion of the first self-adhering material to bond directly to the fabric layer, and after curing the first and second layers, cutting one or more insoles from the laminate.

In another representative embodiment, a method for making footwear insoles comprises simultaneously applying a first continuous layer of a liquid silicone rubber along the length of a surface of a fabric layer and applying a second continuous layer of a liquid silicone rubber over the first layer to form a laminate, wherein the liquid silicone rubber of the second layer has a greater amount of a tackifier material than the liquid silicone rubber of the first layer. The method further comprises curing the first and second layers, causing at least a portion of the first layer to bond directly to the fabric layer, and after curing the first and second layers, cutting one or more insoles from the laminate.

In yet another representative embodiment, an insole for insertion into footwear comprises a fabric layer having a peripheral edge defining a toe portion, a heel portion, and an arch portion, the fabric layer having a bottom surface. The insole further comprises a base layer secured to the fabric layer. The base layer comprises a first sub-layer of a self-adhering material directly bonded to the bottom surface of the fabric layer and a second sub-layer of a self-adhering material directly bonded to the first sub-layer, wherein the self-adhering material that forms the first sub-layer has a greater surface tension than the self-adhering material that forms the second sub-layer.

The foregoing and other features and advantages of the invention will become more apparent from the following detailed description, which proceeds with reference to the accompanying figures.

BRIEF DESCRIPTION OF THE DRAWINGS

FIG. 1 is a perspective view of left and right footwear insoles, according to one embodiment.

FIG. 2 is a perspective, exploded view of one of the insoles shown in FIG. 1.

FIG. 11 is an enlarged side view of a portion of the system of FIG. 10.

FIG. 11A is an enlarged side view of an alternative nozzle assembly that can be used in the system of FIG. 10.

DETAILED DESCRIPTION

I. Terms

Unless otherwise noted, technical terms are used according to conventional usage. As used herein, the singular terms "a," "an," and "the" include plural referents unless context clearly indicates otherwise. Similarly, the word "or" is intended to include "and" unless the context clearly indicates otherwise. Also, as used herein, the term "comprises" means "includes." Hence "comprising A or B" means including A, B, or A and B.

The materials, methods, and examples provided are illustrative only and not intended to be limiting. Although methods and materials similar or equivalent to those described herein can be used in the practice or testing of the present disclosure, suitable methods and materials are described below.

In order to facilitate review of the various examples of this disclosure, the following explanations of specific terms are provided:

Aliphatic: Any open or closed chain molecule, excluding aromatic compounds, containing only carbon and hydrogen atoms which are joined by single bonds (alkanes), double bonds (alkenes), or triple bonds (alkynes). This term encompasses branched aliphatic compounds, linear aliphatic compounds, saturated aliphatic compounds, unsaturated aliphatic compounds, and combinations thereof.

Aryl: A substantially hydrocarbon-based aromatic compound, or a radical thereof (e.g., $C_6H_5$) as a substituent bonded to another group, particularly other organic groups, having a ring structure as exemplified by benzene, naphthalene, phenanthrene, anthracene, etc.

Cyclic: Designates a substantially hydrocarbon, closed-ring compound, or a radical thereof. Cyclic compounds or substituents also can include one or more sites of unsaturation, but does not include aromatic compounds. One example of such a cyclic compound is cyclopentadienone.

Heteroaryl: Refers to an aromatic, closed-ring compound, or radical thereof as a substituent bonded to another group, particularly other organic groups, where at least one atom in the ring structure is other than carbon, and typically is oxygen, sulfur and/or nitrogen.

II. Description

Figure 3:
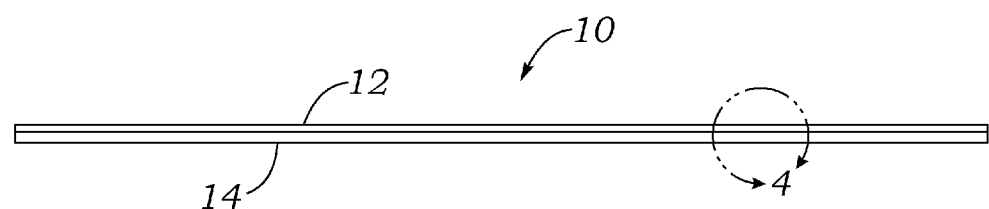
FIG. 3 is a side view of the insole shown in FIG. 1.
Figure 4:
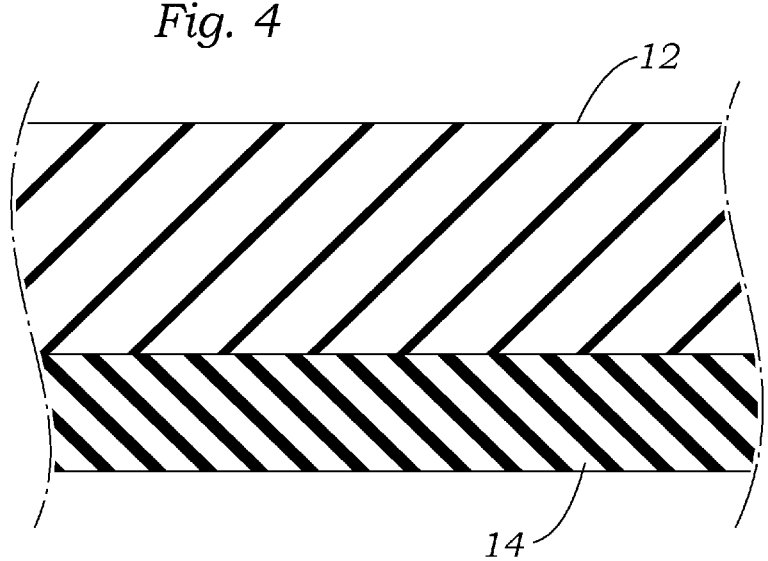
FIG. 4 is an enlarged side view of a portion of the insole of FIG. 3.

The present disclosures concerns embodiments of a footwear insole that can be used with various types of footwear, including, without limitation, shoes (including open and closed toe shoes), boots, sandals, etc. FIG. 1 is a perspective view of left and right footwear insoles 10, according to one embodiment. As best shown in FIGS. 2 and 3, the insole 10 comprises a top fabric layer 12 and a slip-resistant, cushioning bottom, or base, layer 14. The insole 10 has a peripheral edge 18 defining a toe portion, a heel portion and an arch portion between the toe and heel portion. The insole has an overall shape defined by the peripheral edge 18 that is adapted for insertion into a wide variety of different types of footwear.

The bottom layer desirably comprises a tacky material that can be directly bonded to the fabric layer 12, and can adhere temporarily to the upper surface of a footbed or other subsurface. The insoles 10 are configured to be easily inserted into and removable from footwear. The insoles 10 do not require adhesives to hold them in place and therefore they do not damage the inner surfaces of the footwear when removed like conventional insoles that rely on adhesives. In particular embodiments, the bottom layer 14 is a continuous layer of material that covers substantially the entire lower surface of the fabric layer 12. For example, in some embodiments, the bottom layer 14 can cover at least 80% of the lower surface of the fabric layer. In other embodiments, the bottom layer 14 covers 100% of the lower surface of the fabric layer.

The top layer 12 is in contact with the foot of the wearer during use if socks are not worn. The top layer 12 can be any common woven or non-woven fabric, including any of various fabrics made from natural or synthetic fibers. Examples include, without limitation, wool felt, cotton batting, polyethylene terephthalate (PET) pile (fleece), cotton terry, canvas, shearling and various flannels. In particular embodiments, the top layer 12 functions like a sock. For example, the material for forming the fabric layer desirably is selected to absorb moisture, provide warmth or cooling, and provide a comfortable feel against the skin. As such, the selected material is more than a decorative layer and desirably has a thickness sufficient to create a structure that provides air passages below the foot and allows air to move under foot. In certain embodiments, the fabric layer 12 has a thickness in the range of about 1 mm to about 5 mm. However, in other embodiments, a fabric layer 12 formed from a very plush fabric, such as shearling, can have a thickness up about 20 mm or greater.

Different people at different times want exposure to different materials. Similarly, in general, people own wool socks, cotton socks, fleece socks, sweat-wicking socks, etc. and select the preferred material depending on their planned activity. Similarly, insoles 10 can be manufactured using a wide variety of materials for the fabric layer 12 so that users can choose from among the various materials depending on personal preference, activity need, and appearance.

The material and design of the bottom layer 14 of the insole desirably is such that the insole can be retained in place against the upper surface of the footwear during normal use (i.e., the insole does not slip relative to the footbed), yet can still be easily removed from the footwear for washing. One way of measuring the ability of an article, such as an insole, to adhere to an underlying surface involves measuring the shear strength of the material, which is the ability of the material to resist a pulling force on the material acting in a direction parallel to the underlying surface. Shear strength can be defined as a summation of at least friction (the adhesion of microscale contact surfaces) and mechanical interlocking between the two contacting surfaces. Another measure of the insole's ability to adhere to an underlying surface is the "tack value", which is the ability of the insole to resist a force pulling on the insole in a direction perpendicular to the underlying surface. The shear strength of the bottom layer 14 can be optimized, for example, by maximizing the surface area in contact with the footwear and selecting a generally chemically tacky material for forming the bottom layer 14. To maximize surface area, it is desirable to provide a bottom layer having a very smooth lower surface or a surface roughness that is similar to the surface roughness of the mating surface of the footwear. In addition, the bottom layer desirably is sufficiently flexible or conformable to allow the insole to conform to the curved surface of the footbed of the footwear.

The bottom layer 14 can comprise any of various polymeric, elastomeric, and/or viscoelastic materials, but desirably also comprises a self-adhering curable material which can be directly bonded to the fabric layer. As used herein, a "self-adhering" material is a material or composition applied in liquid form to another layer and adheres to and forms a permanent bond with other layer when cured. For example, in some embodiments, a "self-adhering" material is applied in liquid form to a fabric layer and adheres to and forms a permanent bond with the fibers of the fabric layer when cured. In other embodiments, a "self-adhering" material can be applied in liquid form to another layer of "self-adhering" material in liquid form, which materials adhere to each other and form a permanent bond when cured. Thus, such self-adhering materials need not include a separate, intermediate layer of adhesive to secure a fabric layer 12 to a base layer 14 and can instead be directly bonded thereto. Similarly, a first layer of a self-adhering material can be secured and directly bonded to a second layer of a self-adhering material without a separate, intermediate layer of an adhesive. As used herein, "directly bonded" means that a first material is bonded to a second material without any intermediate layer, such as an intermediate adhesive layer, between the first and second materials.

In many cases, when a self-adhering curable polymeric, elastomeric, or viscoelastic material is applied in liquid form to a fabric layer, the fabric layer can absorb the self-adhering material to some extent. Thus, when cured, the self-adhering material can form a solid material which surrounds or encapsulates portions of some of the fibers of the fabric layer. In addition to the aforementioned characteristics of the bottom layer, another desirable design criteria is that it be capable of being bonded to the fabric layer 12 in a permanent and durable manner such that the insole can be washed repeatedly in a standard washing machine. Moreover, the material for forming the bottom layer desirably is selected to exhibit a desired amount of tackiness that does not substantially diminish after repeated wash cycles.

In particular embodiments, the bottom layer 14 comprises a liquid silicone rubber (LSR), which is a self-adhering coating composition. The LSR can contain at least one silicon-containing compound or polymers thereof. In particular embodiments, the silicon-containing compound or polymer thereof is an organosiloxane or polymer thereof. The organosiloxane may be cyclic or acyclic. Particular embodiments concern organosiloxane compounds having a general Formula 1, shown below.

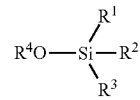

Formula 1

With reference to Formula 1, $R^1$, $R^2$, $R^3$, and $R^4$ independently can be selected from hydrogen, aliphatic, aryl, or a heteroatom containing moiety. The heteroatom moiety can be selected from hydroxyl, ether, ester, ketone, aldehyde, amine, amide, heteroaryl, alkyl halide, aryl halide (wherein halides selected from chlorine, iodine, bromine, and fluorine), acyl halide, carbonate, peroxy, hydroperoxy, phosphate, phosphoryl, phosphine, sulfinyl, sulfonyl, thiol, cyano, and combinations thereof.

In particular embodiments, the organosiloxane can have a general Formula 2 and/or 3, illustrated below.

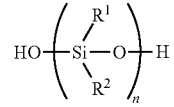

Formula 2

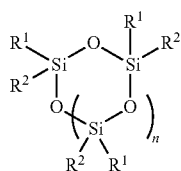

Formula 3

With reference to Formulas 2 and 3, $R^1$ and $R^2$ independently can be selected from hydrogen, aliphatic, aryl, or a heteroatom containing moiety (selected from hydroxyl, ether, ester, ketone, aldehyde, amine, amide, heteroaryl, alkyl halide, aryl halide [wherein halides selected from chlorine, iodine, bromine, and fluorine], acyl halide, carbonate, peroxy, hydroperoxy, phosphate, phosphoryl, phosphine, sulfinyl, sulfonyl, thiol, and cyano); and n ranges from at least 2 to about 1000; more typically from at least two to about 100; more typically from at least 2 to about 50.

In a specific implementation, the bottom layer 14 is formed from a liquid silicone rubber comprising a polydimethylsiloxane elastomer, one example of which is sold under the tradename Dow Corning 3730. In working embodiments, the LSR layer covers the entire bottom surface of the fabric layer 12 and has a thickness in the range of about 0.3 mm to about 6 mm.

LSR is advantageous for several reasons. First, it is notably non-toxic and is often used in a number of common household kitchen tools and garments. Second, it has a translucent, almost clear, appearance, which is desirable for certain applications. For example, printed matter, such as branding or the insole size, can be printed on the bottom of the fabric layer 12. The printed matter is clearly readable through the LSR bottom layer. Third, the manufacturing process substantially minimizes the amount of solvents used (unlike calendaring, or the tackification of some polymers) and therefore is safer and less expensive than processes requiring large amounts of solvents. In the process described below, a relatively small amount of a solvent is used as a tackifier for the LSR. Fourth, commercially available LSR can be further modified to increase or decrease tackiness as required for a particular application.

In alternative embodiments, materials other than LSR can be used to form the bottom layer but typically require the use of solvents. Some examples of other materials that can be used to form the bottom layer include, for example, urethane, EDPM, vinyl rubber, neoprene, latex rubber, buna rubber, natural rubber and other similar materials.

A surprising result of the insole is its durability in the wash and wear cycle. In one embodiment, for example, the insole 10 comprises a fabric layer 12 made of wool felt and bottom layer made of LSR. Wool felt is notorious for an inability to be washed in hot water and then dried in a hot air machine without substantial shrinking. The combination of heat and agitation causes the scales of wool fibers to work past each other and hold the sheet of textile into a smaller mass. However, bonding wool felt to an impervious layer of LSR prevents shrinking of the wool felt. The individual fibers of the textile are not allowed to move enough with respect to each other and as such, the material can withstand an indefinite number of wash and wear cycles without any noticeable shrinking.

Figure 6:
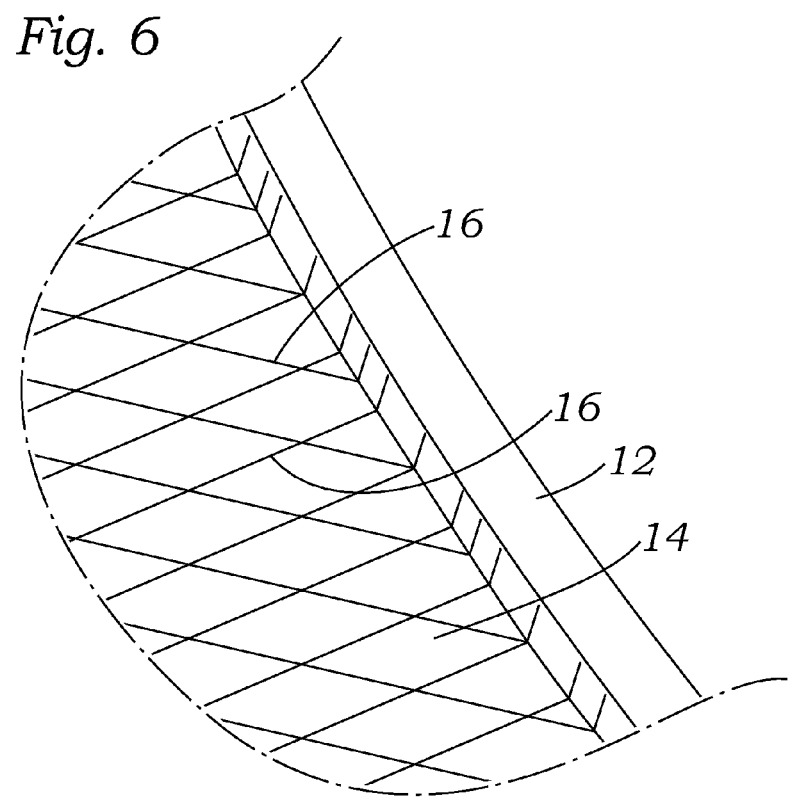
FIG. 6 is an enlarged, bottom perspective view of a portion of the insole of FIG. 5.

The shear strength of the interface between the bottom surface of the bottom layer 14 and the subsurface to which it is mounted (e.g., the upper surface of a footbed) can be further enhanced by sipes 16 (which can be referred to as "micro-sipes" because they can be formed relatively small). As best shown in FIG. 6, sipes 16 are slits or cuts in the bottom layer 14 that can be formed by stamping or cutting the bottom layer with a blade or equivalent mechanism. The sipes 16 desirably have no width (i.e., the material on opposite sides of a sipe can contact each other when the insole is laid flat), although in other embodiments the sipes can have a measurable width, in which case they form very narrow grooves or slots in the base layer 14.

As shown, the sipes can extend from the bottom surface of layer 14 only partially through thickness of the bottom layer such that the sipes terminate short of the upper surface of layer 14, although in other embodiments the sipes can extend the entire thickness of layer 14. In particular embodiments, for example, the sipes have a depth (measured from the bottom surface of layer 14 toward the fabric layer 12) of about 0.3 mm to the full thickness of layer 14 (which can range, for example, from about 0.3 mm to about 6 mm).

Figure 5:
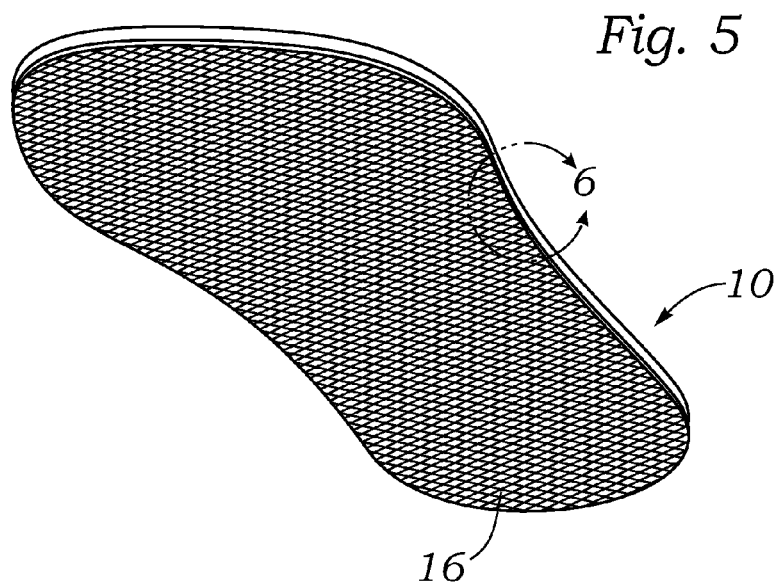
FIG. 5 is a perspective bottom view of an insole having a pattern of slits or cuts formed in the bottom of the insole.

The sipes 16 can be formed in any desired pattern on the lower surface of layer 14, such as the criss-crossing pattern shown in FIGS. 5 and 6. The illustrated pattern of sipes comprises a first set of spaced-apart parallel lines intersecting spaced-apart parallel lines of a second set. The spacing between parallel sipes can be in the range of about 1 mm to about 15 mm. The sipes desirably are oriented generally perpendicular to the length of the insole 10, extending generally laterally across the width of the insole from one edge of the insole to the other. In another embodiment, the sipes 16 can be formed in a pattern in which all of the sipes are parallel to each other and extend in the same direction. In other embodiments, the sipes can be curved and/or they can extend partially across the width of the insole. It is believed that the sipes can enhance the shear strength of layer 14 by interlocking with surface features of the opposing subsurface. In addition, tensile forces applied to the insole, as can occur during walking or running, can cause the insole to shift relative to the underlying surface of the footwear. The sipes can break the strain path on the bottom layer across a large distance caused by tensile forces on the insole to help maintain the bottom layer in intimate contact with the underlying surface.

The sipes are further advantageous in that they provide capillaries or pathways that help wick away excess water from the interface of the bottom layer and the underlying surface. Moreover, the sipes increase the flexibility of the insole and its ability to conform to the shape of the footbed.

A preferred method of manufacturing the insole 10 involves the use of LSR. LSR handles well without the need for solvents. Other types of polymers can be used instead of LSR but require more involved bonding processes that are more expensive and make use of solvents. For instance, urethane can be used to form the bottom layer 14 but its processing is substantially more toxic and typically requires more complex health and safety control systems and permitting.

Various techniques and/or mechanisms can be used to apply the bottom layer 14 to the fabric layer 12, depending on the material selected for forming the bottom layer. One specific process for manufacturing insoles 10, which involves coating a layer of fabric with a liquid polymer, is described in detail below. Other known techniques can be used for bonding polymers to fabric, such as calendaring and various forms of coating.

Figure 7B:
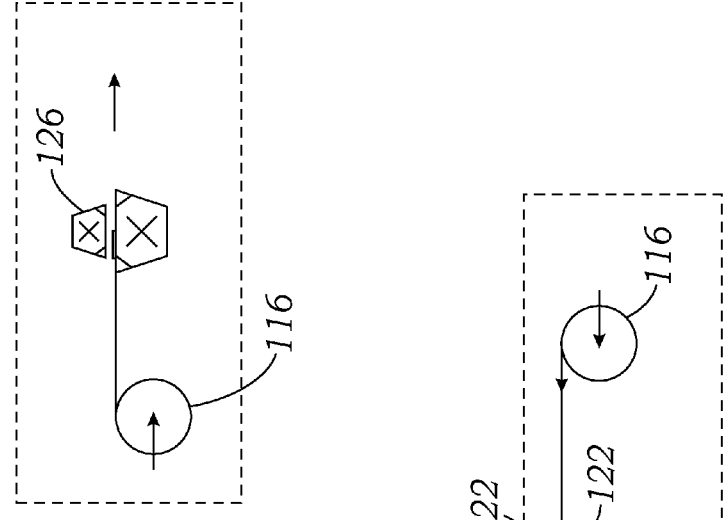
FIGS. 7A and 7B are block diagrams illustrating a method of manufacturing footwear insoles, according to one embodiment.
Figure 7A:
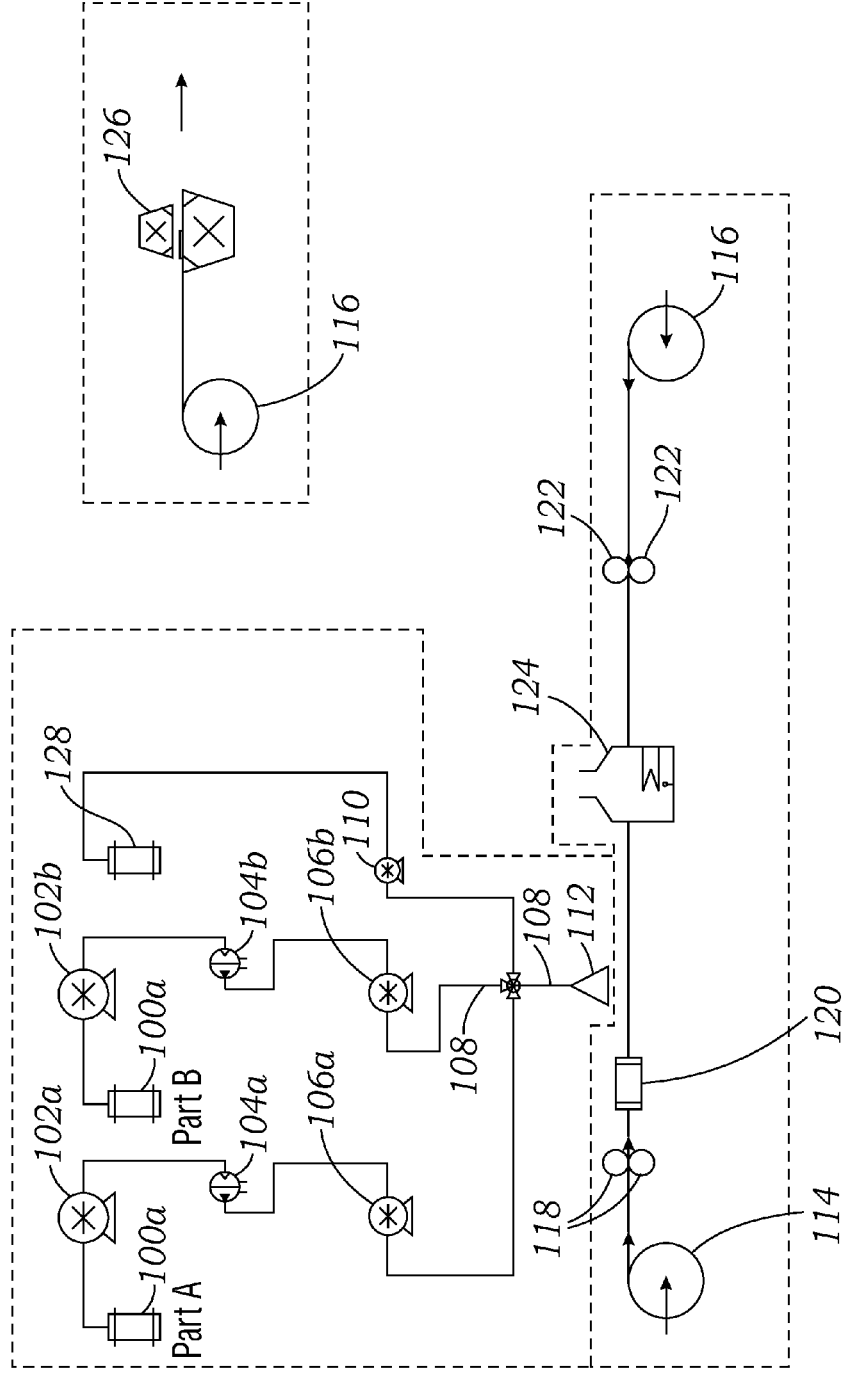
Figure 8:
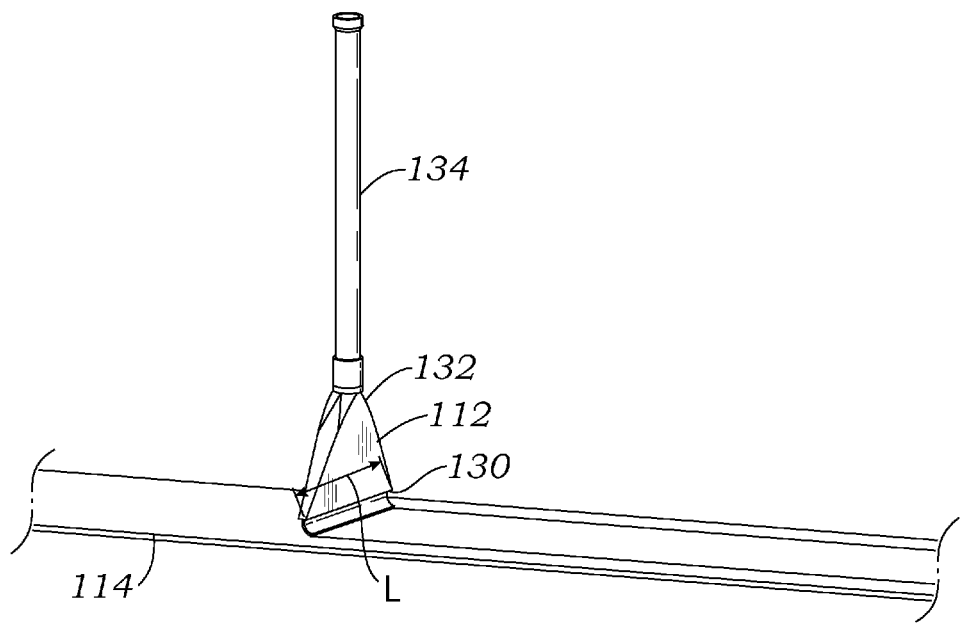
FIG. 8 is a perspective view of a nozzle dispensing a liquid polymer, such as liquid silicone, onto a layer of fabric material.

FIGS. 7A, 7B and 8 show an exemplary system for manufacturing footwear insoles. For purposes of description, the illustrated system is described in the context of using an LSR that is commercially available as a two-part kit, such as Dow Corning 3730, for forming the base layer 14 of the insoles. However, the system illustrated in FIGS. 7A, 7B and 8 and described herein can also be adapted for manufacturing insoles using a material other than LSR for forming the base layer 14.

As shown in FIG. 7A, separate pumps 102a, 102b remove the two LSR components (identified as Part A and Part B in FIG. 7A) from their respective reservoirs 100a, 100b (e.g., shipping containers). The output pipes of each of these pumps transfer the LSR components into respective downstream precision metering pump systems (each comprising a respective pressure and flow controller 104a, 104b and a respective pump 106a, 106b downstream of the pressure and flow controller) that maintain an output flow of each component part with a highly controlled volumetric flow rate and pressure. The two flows meet at the input end of a static mixer 108. Additional ingredients can be added to the mixture, such as a tackifying agent (e.g., a high molecular weight solvent, such as naphtha), which can be stored in a reservoir 128. The dosage of the tackifying agent can be tightly controlled by a precision gear pump 110. The output end of the static mixer feeds into a dispensing nozzle 112 that shapes the flow of LSR into a band which is applied onto the material that forms the fabric layer of an insole.

In particular embodiments, the mixture dispensed from the nozzle comprises about 55% to about 80% Part A of Dow Corning 3730 LSR, and more particularly about 60% to about 80% Part A of Dow Corning 3730 LSR; about 20% to about 45% Part B of Dow Corning 3730 LSR; and 0 to 5% naphtha.

The fiber material in the illustrated embodiment is provided as a roll of material 114. The roll 114 is unwound from an upstream dereeler, and rewound onto another roll or spool 116 at the end of the processing after the LSR is applied to the fiber material. Feed rollers 118, 122 upstream and downstream of the dispensing nozzle 112 keep the fiber moving at the correct amount of line tension and at the correct velocity. Between the upstream feed rollers 118 and the nozzle 112 the fiber material extends through a printing device 120 that can print identification and/or branding information on the fiber material. The printing device 120 can comprise, for example, a rotary screen printer, an industrial ink jet printer, a rotary pad printer, or equivalent mechanism.

Following the printing device 120, the layer of fabric material 114 is fed under the nozzle 112, which dispenses LSR onto the fabric layer to form a laminate comprised of the fabric layer and a layer of uncured LSR. Referring to FIG. 8, the nozzle 112 in the illustrated embodiment has a tapered, generally triangular body comprising a wide lower end 130 defining an outlet opening for dispensing the LSR and a relatively narrow upper end 132 that is in fluid communication with a feed pipe 134 that transfers LSR from the mixer 108 to the nozzle 112. The outlet opening at the lower end 130 of the nozzle 112 desirably is sized to apply a continuous layer of LSR that covers substantially the entire upper surface of the fabric material. As shown in FIG. 8, the length L of the outlet opening (the length L extending perpendicular to the longitudinal edges of the fabric material) can be equal to or slightly smaller than the width of the fabric material 114 to ensure that the LSR forms a layer covering substantially the entire upper surface of the fabric material.

Referring again to FIG. 7A, between the nozzle 112 and the downstream feed rollers 122, the laminate extends through a continuous feed curing oven 124 that cures the LSR causes it to bond directly to the fibers of the fabric. The cured LSR and fiber material sheet then is rewound onto roll 116 to wait for further processing. In particular embodiments, the curing or residence time in the oven is in the range of about 1 to 5 minutes and the curing temperature of the oven is in the range of about 250 degrees F. to 450 degrees F.

Referring to FIG. 7B, the LSR coated fabric can be dispensed from the roll 116 into a cutting apparatus 126 that cuts left and right insoles 10 of the same size from the coated fabric. If desired, sipes 16 can be formed in the LSR layer, such as by feeding the LSR coated fabric through a sipe-forming station (not shown) upstream of the cutting apparatus 126. The sipe-forming station can include, for example, one or more rollers having a series of blades that cut sipes into the LSR layer. After the insoles 10 are cut into their final shape by the cutting apparatus, they can be packaged as needed.

Insoles and processes for forming insoles as described herein have several advantages over known insoles and manufacturing processes. For example, the process of bonding LSR to fabric described above is simple, inexpensive and safe and does not involve monitoring of pollutants or environmental and health hazards such as with solvents. The insole does not use or require adhesives like many known insoles. Adhesives are not typically able to withstand the wash and dry cycle of a typical household laundry without delaminating or preventing shrinkage of many textiles. Unlike prior solutions, the insole can be treated like a normal everyday garment that is worn and subsequently washed and dried mechanically with other clothes. The insole can be subjected to numerous wash and wear cycles without delaminating or shrinking like insoles that incorporate adhesives (which are usually disposed of after soiling).

Example 1

Figure 9:
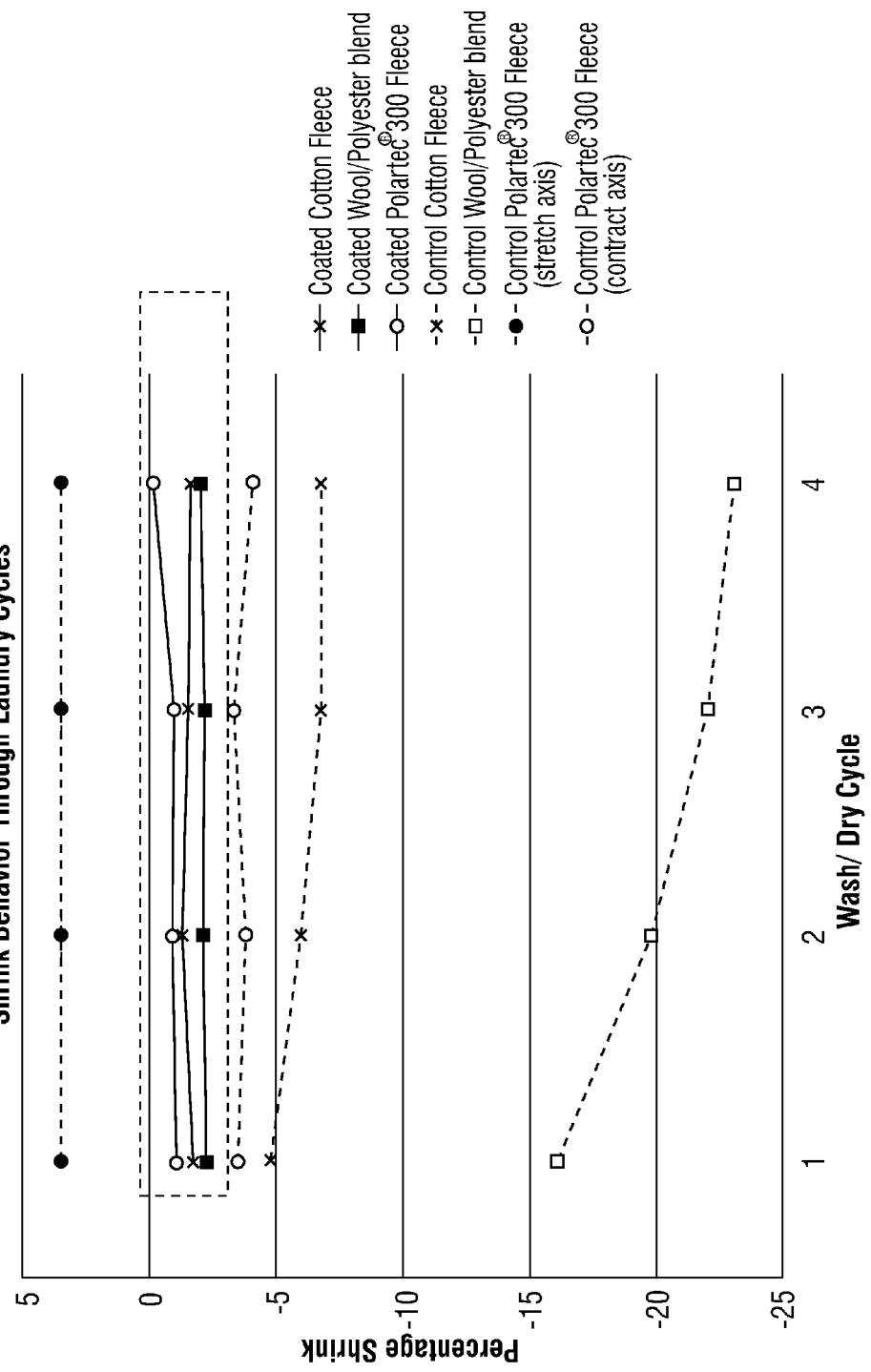
FIG. 9 is a graph showing the shrinkage of three different insoles compared to the shrinkage of the bare fabric.

Several insoles were made by forming a layer of LSR on the following types of fabric: cotton fleece, an 80% wool/20% polyester blend felt, and Polartec® 300 fleece. Shrinkage of the insoles was measured using the ISO 3759 standard for preparation of marking and measuring textiles for dimensional change. Shrinkage was encouraged by four wash-dry cycles loosely guided by the ISO 6330 standard Type B (rotary agitator washer) and Procedure E (tumble dry). The washing temperature was about 64 degrees C. to about 66 degrees C. The dry load was about 6.7 kg, and included three samples of each of the coated fabrics. In addition to the coated materials, uncoated control fabrics were washed and dried in the same batch. Through successive aggressive wash and dry cycles the coated fabrics were constrained to limited dimensional change. The average shrinkage for each type of coated and uncoated fabric is shown in FIG. 9. As shown, the coated materials were constrained to a dimensional change of less than 3% while the uncoated materials experienced greater shrinkage, most notably the wool/polyester blend, which shrank by about 23% after four wash and dry cycles.

Example 2

Various standards can be used to quantify the tack value and shear strength of the base layer of the insole, including ASTM D2979, ASTM D1894, and ASTM D3654 Procedure A (Test Methods for Shear Adhesion of Pressure Sensitive Shapes). In particular embodiments, the insole has a base layer formed from LSR having a tack value of about 0.2 N to about 2.2 N, and more desirably between about 1 N to about 2 N, as measured according to ASTM D2979.

Under ASTM D1894, the shear strength of a material is defined as ratio equal to the pulling force applied to the test material to the total mass resting on top of the test material. In particular embodiments, the insole has a base layer formed from LSR having such a ratio in the range between about 2 to about 24.

ASTM D3654 Procedure A measures the time it takes for an adhesive material to separate from another surface under gravity. Under this standard, an insole having a base layer formed from LSR did not have a measurable value. Comparatively, a known footwear insole sold under the brand Summer Soles, which has an adhesive on its lower surface, measured 1 minute, 10 seconds under this standard.

III. Additional Embodiments

In some cases, the base layer of an insole can have a variable chemical composition across its thickness. For example, an insole can be fabricated having a base layer which is tackier at its bottom, exposed surface than at a top portion (e.g., the portion directly bonded to a fabric layer) of the base layer.

As described above, it can be desirable to form a base layer from materials which provide an insole with a tacky bottom, exposed surface, so that the insole will be held against the upper surface of a footbed of the user's footwear while the insole is in use. It has been discovered, however, that as the tackiness of the materials used to form the base layer is increased, its surface tension can decrease, and as a result, the base layer materials are typically absorbed into the fabric layer to a greater degree than desired, e.g., through increased capillary action, during the fabrication process.

This can be undesirable, for example, because it can reduce the effective thickness of the fabric enabling air flow and wicking of perspiration from the user's foot. This can also be undesirable because it can increase the cost to fabricate the insole (e.g., because more of the base layer materials are required). This can also be undesirable because in some cases, the base layer materials can be absorbed into the fabric to such a degree that some of the fibers of the fabric layer are exposed at the bottom surface of the base layer, thus interfering with the properties of that surface (e.g., by reducing the surface area of the base layer materials that will contact the upper surface of the footbed of the user's footwear, or by making it rougher than desirable). Thus, methods and devices enabling the fabrication of a base layer of an insole having a variable chemical composition across its thickness are desirable. By varying the composition of the base layer, the degree to which the base layer is absorbed by the fabric layer can be controlled.

It has been found that several alternative methods of increasing the tackiness of the base layer material may be undesirable for various reasons. For example, in one alternative method, the fabric layer can be treated with a coating that either makes the fabric have a high contact angle with respect to the low surface tension liquid or simply prevents the low surface tension liquid from being absorbed into the fabric (e.g., the coating can form a solid boundary layer). In one other example, the fabric can be treated with a plasma.

Treating the fabric with a coating to increase the contact angle can be undesirable because the treatment has to be tailored to both the fabric and the base layer materials. That is, chemicals that adhere to the particular fabric and create a high contact angle with the particular chemistry of the low surface tension base layer materials without compromising the ability of the base layer materials to bond to the fabric must be developed. It can be time consuming and expensive to develop and maintain materials that modify various fabrics in such a manner. It would likely also require the development of multiple such materials, e.g., for the various fabrics to be used in the insoles. This would represent an additional cost in both material costs and equipment and supply chain management. Such a technique may also lead to a weaker bond between the fabric layer and the base layer and lead to more rapid delamination of the insoles.

Treating the fabric layer with a coating to prevent the base layer materials being absorbed into the fabric layer can also be undesirable. First, the coating is an additional material that needs to be bonded to the fabric layer and lie between the fabric layer and the base layer, and represents an additional manufacturing and raw material cost. The method of coating the fabric layer adds complexity and capital requirements to the process, and may require techniques such as calendaring. The previously mentioned drawbacks also apply: the material used to coat the fabric layer (and create a boundary layer) has the constraints of needing to bond to both the fabric layer and the base layer materials, and it may be difficult and/or expensive to find or develop a coating material suitable for use with a variety of fabrics, creating additional process and supply chain burdens.

Treating the fabric layer with a plasma (e.g., an electrically excited plasma) can also be undesirable. For example, the use of plasma creates an additional process and material cost, and the treatment may have to be tailored to the particular fabric being used due to differences in geometries and chemistries.

Accordingly, in one embodiment, an insole can have a base layer of a self-adhering material having a variable chemical composition across its thickness such that a first sub-layer of the base layer is in contact with the fabric and a second sub-layer of the base layer forms a bottom surface of the insole that can contact the footbed of footwear, wherein the first sub-layer has increased surface tension and reduced tackiness relative to the second sub-layer and the second sub-layer has decreased surface tension and increased tackiness relative to the first sub-layer. The composition of the first sub-layer is selected such that the self-adhering material is absorbed at least partially by the fabric to provide a sufficient bond between the base layer and the fabric, and still allow the fabric to have sufficient breathability and provide sufficient wicking action to absorb perspiration. The composition of the second sub-layer is selected to have sufficient tackiness such that the insole can be held against the upper surface of a footbed during normal use.

Figure 10:
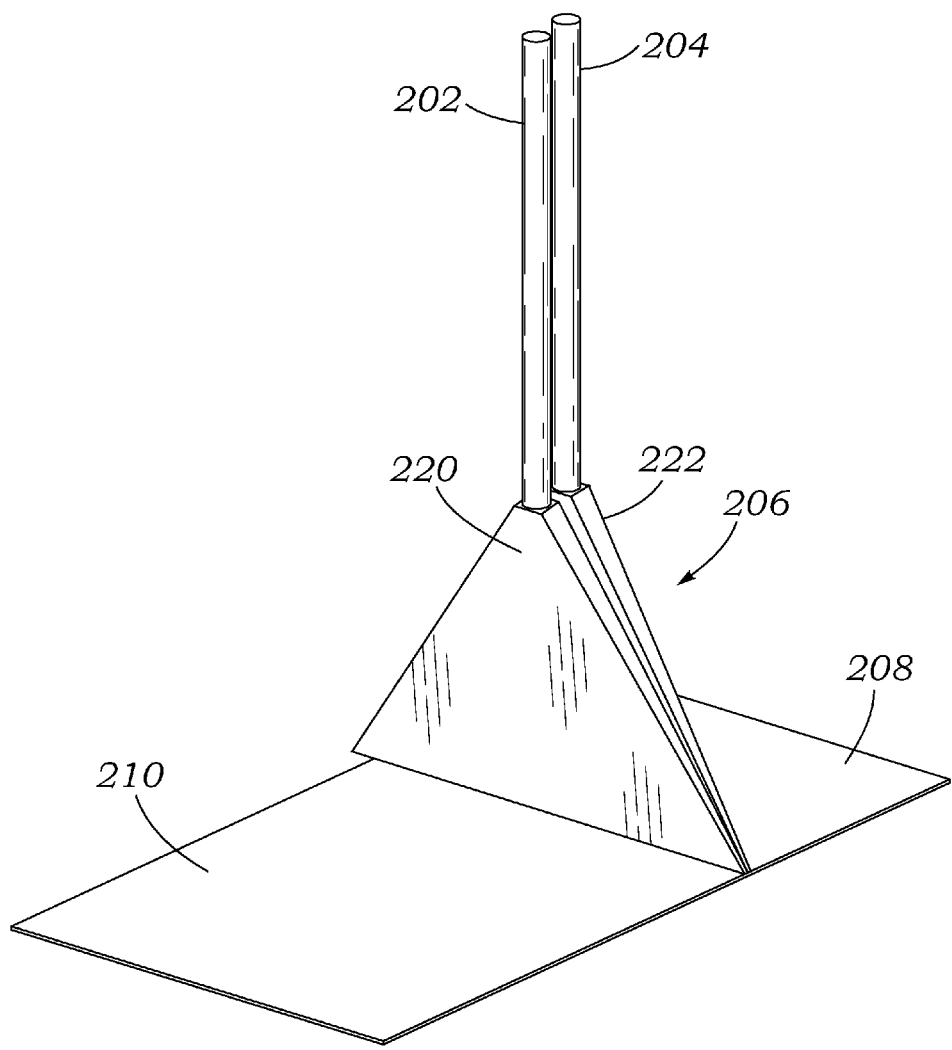
FIG. 10 is perspective view of a co-extrusion system for fabricating exemplary insoles.

FIGS. 10 and 11 show a process and device for forming such an insole. As shown, first and second separate streams of self-adhering material 214, 216 are pumped through respective first and second separate mixing channels, or conduits, 202, 204 and co-extruded onto a fabric layer 208. The first and the second conduits 202, 204 can be in communication with a spreading nozzle assembly 206 that spreads the materials into a long narrow ribbon 210 that is deposited onto the fabric layer 208.

The self-adhering material introduced through the first conduit 202 forms the lowermost sub-layer (in use) of the base layer of an insole and has a desired amount of a tackifier to increase the tackiness of the base layer. The self-adhering material introduced through the second conduit 204 is applied directly to the fabric and has no tackifier or less tackifier than the self-adhering material introduced through the first conduit 202 to limit the amount of self-adhering material absorbed by the fabric.

In particular embodiments, the self-adhering materials 214, 216 comprise liquid silicone rubber, such as the commercially available Dow Corning 3730 product, mixed in one example at 60% part A and 40% part B but different amounts of a tackifier material. In other embodiments, the product can be mixed at 50% part A and 50% part B.

The first material 214 comprises, for example, a first liquid silicone rubber mixed with a tackifier material, wherein the tackifier material comprises at least 40% but less than 90% by volume of the resulting mixture 214. The second material 216 comprises, for example, a second liquid silicone rubber 216 without any tackifier material, or a second liquid silicone rubber mixed with less tackifier material than the first liquid silicone rubber (for example, where the tackifier material comprises no more than 20% by volume of the resulting mixture 216). The tackifier material can comprise a polyorganosiloxane polymer, such as a polydimethylsiloxane polymer. Suitable examples of tackifier materials that can be used include those available under the names Slacker® (available from Smooth-On, Inc.) or PMX-200 (available from Dow-Corning), which is a polydimethylsiloxane polymer.

As best shown in FIG. 11, the nozzle assembly 206 can have a first nozzle 220 and a second nozzle 222. The first nozzle 220 receives the self-adhering material from the first conduit 202 and deposits a stream or layer 214 of the self-adhering material on a stream or layer 216 of the self-adhering material that is deposited on the fabric layer 208 by the second nozzle 222. In some cases, the nozzle assembly 206 can be stationary and the fabric layer 208 can travel beneath the nozzle assembly 206, or the fabric layer 208 can be stationary and the nozzle assembly 206 can travel over the fabric layer 208, to deposit the base layer 210 on the fabric layer 208.

In some cases, at the base of the spreading nozzle assembly 206, the ribbons formed of the two materials 214, 216 can be introduced to each other (e.g., at location 212) in an airtight environment, such that the two materials 214, 216 forms a single base layer 210 without e.g., any air bubbles between the materials 214, 216. Thus, the base layer 210 formed on the fabric layer 208 form a single solid layer of material having a tackifier within it, the tackifier having a variable concentration across the thickness of the base layer 210.

Moreover, the first and second nozzles 220, 222 can have respective nozzle outlets 228, 230 that abut each other or are closely adjacent to each other at the same height above the fabric layer 208. In this manner, the first and second materials 214, 216 can come into contact with each other at location 212, or at a location below the nozzle outlets and above the fabric layer, to form a dual layer that is applied to the fabric layer 208.

In an alternative embodiment, as shown in FIG. 11A, the nozzle assembly can have a central wall between the first and second nozzles 220, 222 that terminates at a location 232 that is spaced above the lower ends of the nozzles. In this manner, the nozzles converge to form a single nozzle outlet 234. In use, the first and second materials 214, 216 can come into contact with each other at a location within the lower portions of the nozzles, forming a dual layer that is dispensed from the common nozzle outlet 234. Forming the dual layer within the nozzle assembly is advantageous in that it promotes adhesion between the two streams of material without air bubbles therebetween.

In some cases, the nozzle assembly 206 can be augmented, for example, to provide additional streams of various materials. As one example, an additional stream of material could be introduced between the materials 214, 216, e.g., through a mixing channel positioned between channels 202, 204.

The fabric layer 208 having the base layer 210 deposited thereon can then be cured, such as in a curing oven, to produce a cured laminate. Curing can be accomplished according to standard liquid silicone rubber manufacturer recommendations. It has been found that, in this fabrication process, the second material 216 including little or no tackifier material (or less tackifier than the first material 214) is absorbed into the fabric layer to an extent sufficient to allow the material 216 to be directly bonded to the fabric layer, as described above, but not to such an extent that the aforementioned drawbacks of a low surface tension material arise. In some cases, once exposed to one another at location 212, the materials 214, 216 can mix at their interface to some extent. Thus, the resulting product can consist of a single fabric layer bonded to a single base layer, the base layer having a variable chemical composition across its thickness. Once the base layer has cured, insoles can be cut out from the composite material, e.g., in the shape of a foot.

The insoles can be formed in a process similar to that shown in FIGS. 7A and 7B, wherein the fabric layer 208 is supplied from a feed roll 114, optionally through a printing device 120, and through a station where the nozzle assembly 206 dispenses two layers of curable material onto the fabric. The laminate is then fed through an oven 124 and can then be wound around a spool 116. The cured laminate can then be fed through a cutting apparatus 126 that cuts individual insoles from the laminate, as shown in FIG. 7B.

Figure 12:
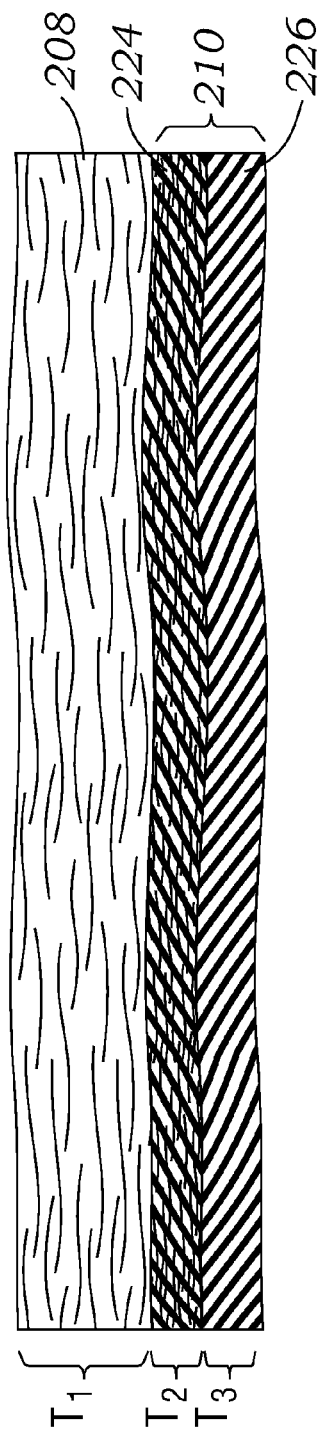
FIG. 12 is an enlarged, cross-sectional view of a laminate formed by the system shown in FIGS. 10-11.

FIG. 12 shows a cross-section of one embodiment of a cured laminate comprising a fabric layer 208 and a base layer 210. The base layer 210 in the illustrated embodiment comprises a fabric and self-adhering material sub-layer 224 bonded to the fabric layer 208, and a self-adhering material sub-layer 226 bonded to the sub-layer 224. In the embodiment shown, the fabric and self-adhering material sub-layer 224 is formed by the absorption of the self-adhering material layer 216 by the fibers of the fabric layer 208 and forms a strong bond with the fabric. The self-adhering material sub-layer 226 is formed by the material 214, which in the illustrated embodiment is not absorbed by the fabric layer, or only absorbed by the fabric layer a limited amount. As can be appreciated, the sub-layer 224 is directly and permanently bonded to the fabric layer 208 without any intervening layers of adhesive. Similarly, the sub-layer 226 is directly and permanently bonded to the sub-layer 224 without any intervening layers of adhesive.

In FIG. 12 the sub-layers 224, 226 are shown as two distinct layers for purposes of illustration. However, it should be noted that the material forming the two sub-layers can mix at their interface so as to form a single continuous or homogenous base layer without a seam between the sub-layers 224, 226.

In particular embodiments, the portion of the fabric 208 that is free of any self-adhering material has a thickness $T_1$ of about 2-3 mm; the fabric and self-adhering material sub-layer 224 has a thickness $T_2$ of about 100-400 microns; and the self-adhering material sub-layer 226 has a thickness $T_3$ of about 300-700 microns. In some embodiments, the self-adhering material sub-layer 226 comprises at least about 30% of the total thickness of the base layer 210 (the sum of $T_2$ and $T_3$), at least about 60% of the total thickness of the base layer 210, at least about 70% of the total thickness of the base layer 210, or at least about 80% of the total thickness of the base layer 210, or at least about 90% of the total thickness of the base layer 210.

In some embodiments, the amount of material 214 is at least 30% by volume of the total amount of material used to form the base layer 210 (the total volume of material 214 and material 216), at least 60% by volume of the total amount of material used to form the base layer 210, at least 80% of the total amount of material used to form the base layer 210, or at least 90% of the total amount of material used to form the base layer 210.

In certain embodiments, all or substantially all of the material 216 is absorbed by the fabric and therefore the entire thickness of the sub-layer 224 contains fibers, and all or substantially all of the material 214 is not absorbed by the fabric and therefore the entire thickness of the sub-layer 226 is free of the fibers of the fabric. However, this need not be the case in other embodiments. For example, the composition of the material 216 can be selected such that it is only partially absorbed by the fabric, in which case only a portion of the sub-layer 224 extends into the fabric.

In one specific implementation, the self-adhering material 214 comprises liquid silicone rubber having about 87% by volume of a tackifier (e.g., Dow-Corning PMX-200) and the self-adhering material 216 comprises liquid silicone rubber having about 13% by volume of a tackifier (e.g., Dow-Corning PMX-200).

In use, a pair of insoles can be placed and remain in the footbeds of a user's footwear throughout the term of use, which can be anywhere from several minutes to several days or longer. At the end of the term of use, the insoles can be pulled from the footbeds and laundered using conventional washing and drying machines, as described above. Once laundered, a pair of these insoles can be adhered to one another while stored in a sock drawer or similar personal storage facility before subsequent re-use.

The resulting insole product retains the simplicity of a two layer system, and is thus simple and inexpensive to fabricate. This can reduce the costs of raw materials, the costs of developing and performing various manufacturing steps, the costs of maintaining supply chains, and various equipment costs. The techniques described herein can be advantageous because they can be used to fabricate insoles from a variety of materials (e.g., a variety of different fabrics such as wools, cottons, or synthetics) with very little change to required raw materials or to the manufacturing process. The resulting insoles can also be more robust and less likely to delaminate after numerous cycles of use and laundering. The relatively high concentration of tackifier material in the exposed bottom surface of the insole produces a very smooth and tacky surface which can contact substantially the entire footbed of a user's footwear.

Finally, it should be noted that the materials and processes described herein can be used to make articles other than footwear insoles. In general, an article can comprise a fabric layer (e.g., fabric layer 12) and a bottom layer bonded to the fabric layer (e.g., bottom layer 14). The article can be, for example, a coaster, a floor mat, a dining placemat, a mat for recreational vehicles, a baby changing mat, a rug, a mouse pad, a desk top writing pad, window sill dressing, a shelf liner, a table cloth, a dust cover, etc.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method for making footwear insoles comprising:
    simultaneously applying a first continuous layer of a first self-adhering material along the length of a surface of a fabric layer and applying a second continuous layer of a second self-adhering material over the first layer to form a laminate, wherein the first self-adhering material has a greater surface tension than the second self-adhering material;
    curing the first and second layers, causing at least a portion of the first self-adhering material to bond directly to the fabric layer; and
    after curing the first and second layers, cutting one or more insoles from the laminate.

2. The method of claim 1, wherein the second self-adhering material has greater tackiness than the first self-adhering material.

3. The method of claim 2, wherein the second self-adhering material comprises an amount of a tackifier and the first self-adhering material does not have a tackifier or has less tackifier by volume than the second self-adhering material.

4. The method of claim 1, wherein the first self-adhering material comprises liquid silicone rubber and the second self-adhering material comprises liquid silicone rubber having a tackifier material, wherein the first self-adhering material does not have the tackifier material or has a lower amount of the tackifier material than the second self-adhering material.

5. The method of claim 3, wherein the tackifier comprises a polydimethylsiloxane polymer.

6. The method of claim 1, wherein:
    applying the first continuous layer comprises dispensing the first self-adhering material from a first nozzle onto the fabric; and
    applying the second continuous layer comprises dispensing the second self-adhering material from a second nozzle onto the first continuous layer.

7. The method of claim 6, wherein the first and second nozzles have respective outlet openings that are positioned closely adjacent to each other such that the first and second materials can contact each other before the first material can contact the fabric layer.

8. The method of claim 6, further comprising supplying the fabric layer from a roll of fabric material to a location where the first and second nozzles dispense the first and second materials and the laminate is formed, and continuously feeding the laminate through a curing oven to cure the first and second materials.

9. A method for making footwear insoles comprising:
    simultaneously applying a first continuous layer of a liquid silicone rubber along the length of a surface of a fabric layer and applying a second continuous layer of a liquid silicone rubber over the first layer to form a laminate, wherein the liquid silicone rubber of the second layer has a greater amount of a tackifier material than the liquid silicone rubber of the first layer;
    curing the first and second layers, causing at least a portion of the first layer to bond directly to the fabric layer; and
    after curing the first and second layers, cutting one or more insoles from the laminate.

10. The method of claim 9, wherein substantially all of the liquid silicone rubber of the first layer is absorbed by the fabric layer.

11. The method of claim 10, wherein the liquid silicone rubber of the second layer is not absorbed by the fabric layer.

12. The method of claim 9, wherein the tackifier material comprises a polydimethylsiloxane polymer.

13. The method of claim 9, wherein:
applying the first continuous layer comprises dispensing liquid silicone rubber from a first nozzle onto the fabric; and
applying the second continuous layer comprises dispensing liquid silicone rubber from a second nozzle onto the first continuous layer.

* * * * *